(12) United States Patent
Wiest et al.

(10) Patent No.: US 7,676,488 B2
(45) Date of Patent: Mar. 9, 2010

(54) CONDITIONAL FORMATTED REPORTING USING SYNTAX CHECKING

(75) Inventors: Lorenz E. Wiest, Walldorf (DE); Karim Mohraz, Wiesloch (DE)

(73) Assignee: SAP AG, Walldorf (DE)

( * ) Notice: Subject to any disclaimer, the term of this patent is extended or adjusted under 35 U.S.C. 154(b) by 445 days.

(21) Appl. No.: 11/264,753

(22) Filed: Oct. 31, 2005

(65) Prior Publication Data

US 2007/0101319 A1    May 3, 2007

(51) Int. Cl.
*G06F 17/00* (2006.01)
(52) U.S. Cl. .............................. 707/102; 707/2; 707/3; 707/4; 707/6; 707/8; 715/204; 715/210; 715/221; 715/222; 715/223
(58) Field of Classification Search .................. 707/6, 707/2, 3, 4, 8, 102; 715/204, 210, 221, 222, 715/223
See application file for complete search history.

(56) References Cited

U.S. PATENT DOCUMENTS

| | | | |
|---|---|---|---|
| 4,247,508 A * | 1/1981 | Housholder ................. 264/219 |
| 6,741,242 B1 * | 5/2004 | Itoh et al. .................... 345/419 |
| 7,111,233 B1 * | 9/2006 | Ballantyne et al. .......... 715/215 |
| 2002/0023261 A1 * | 2/2002 | Goodwin et al. ............ 717/146 |
| 2002/0038320 A1 * | 3/2002 | Brook ......................... 707/513 |
| 2002/0111965 A1 * | 8/2002 | Kutter ......................... 707/513 |
| 2003/0163603 A1 * | 8/2003 | Fry et al. ..................... 709/328 |
| 2004/0187080 A1 * | 9/2004 | Brooke et al. ............... 715/522 |
| 2004/0216010 A1 * | 10/2004 | Muller ........................ 714/38 |
| 2005/0160359 A1 * | 7/2005 | Falk et al. .................... 715/513 |
| 2005/0273737 A1 * | 12/2005 | Youngman et al. ............. 716/4 |

OTHER PUBLICATIONS

Document Type Definition, Jan. 26, 2009. Wkikipedia. pp. 1-11.*

* cited by examiner

*Primary Examiner*—James Trujillo
*Assistant Examiner*—Fatima P Mina
(74) *Attorney, Agent, or Firm*—Mintz, Levin, Cohn, Ferris, Glovsky & Popeo, P.C.

(57) ABSTRACT

A design in a markup language for rendering a report may be generated such that the design and conditions associated therewith are written in a single markup language. Based on this arrangement, both the design and the conditions may be parsed according to a pre-defined grammar to facilitate rapid debugging.

16 Claims, 2 Drawing Sheets

CONDITIONAL FORMATTED REPORTING USING SYNTAX CHECKING

TECHNICAL FIELD

The subject matter described herein relates to conditional formatted reporting.

BACKGROUND

Enterprises are increasingly generating reports to characterize their business and scientific data. Often, these reports include data arranged according to a pre-defined design template. The creation of such reports is referred to as "formatted reporting."

Typical report designs, for example a balance sheet, contain pages with a list of detail rows, a header row on top, and a footer row at the bottom. With such reports, there is usually no need to define the design of each and every detail row. It is sufficient to define the design of just one detail row for a report renderer (e.g., software that produces the final report, for example in HTML- or PDF-format) to apply automatically once to every detail data row during rendering.

When generating a report design, those portions of a report which are to be rendered in an appearance different from other portions of a report must be defined. For example, a report design (also referred to herein as a design) may define that rows containing revenues of a company's French subsidiaries are to be rendered with green background color while all other subsidiaries are rendered with a white background color.

Reporting software packages permit the generation of a design in which conditions may be attached thereto. Only when the attached condition holds during rendering is the report rendered using a format defined by the design. One example is a "zebra" pattern report template in which every odd report detail row is to be rendered with a light blue background and every even report detail row is to be rendered with a dark blue background.

In design tools of reporting software packages, conditions have conventionally been expressed in a proprietary non-markup language. However, reporting software packages are increasingly moving from an arrangement in which designs are stored in proprietary binary format to an arrangement in which designs are stored in textual formats with content expressed in a markup language (such as XML (eXtensible Markup Language)). With the textual format, stored content, which is expressed in a markup language, may be read and understood by a user. In contrast, proprietary binary content cannot be deciphered by users. Moreover, the structure of content expressed in a markup language can be defined by a grammar (see, for example, DTD (Document Type Definition), XML Schema, etc.). By applying such a grammar to content by readily available software tools (Validating XML Parser), the content can be easily checked for syntactical correctness and integrity.

Reporting software packages that permit conditional formatting generally fall in two categories: they either store the design and the conditions in a proprietary, binary format or store the design in a markup language with the conditions embedded into the markup as string literals of an non-markup language (e.g., Java, etc.). While these reporting software packages offer a high degree of flexibility in the final appearance of a rendered report through the use of complicated conditions, such packages as well as rendered reports with faulty visualizations are often difficult to debug and/or require specialized parsing tools which are costly to develop and increase processing times and resource consumption.

SUMMARY

In one aspect, an interface is provided that is operable to enable the generation of a design in a markup language (e.g., XML) for rendering a report. Such a design may specify one or more sections having different visual formats and associated conditions for triggering when such visual formats should be utilized in rendering a report. The conditions are written in the same markup language as the design. By providing the design and the conditions in the same markup language, the interface is additionally operable to parse the design and the conditions according to a pre-defined grammar to determine whether the design and the at least one condition are syntactically correct.

The design may optionally include a written description of a visual format specified in each section to facilitate, for example, debugging of the design. For example, during parsing, which may occur during design-time or during run-time, those portions of the design and condition that are not syntactically correct as well as the written descriptions may be displayed.

Each condition may also comprise one or more expressions which define whether data used to generate the report triggers the conditions. When the report is being rendered, portions of the report will be formatted according to the visual format for each condition having a true expression.

In some variations, at least one of the design, the grammar, and the data used to populate the report, may be retrieved from a data repository accessible via a communications network such as the Internet. Once such information is obtained, the report may be rendered in, for example, a web browser or other graphical user interface. The report may be rendered in a variety of formats such as HTML, Portable Document Format, and the like.

In another aspect, an apparatus may comprise an XML repository, a grammar repository, a parser, and a verification unit. The XML repository is operable to store XML documents containing a design and conditions written in XML. The grammar repository is operable to store XML Schema definitions for the XML documents stored in the XML repository. The parser (e.g., an XML validating parser) is operable to retrieve an XML document from the XML repository and a corresponding XML Schema definition for the grammar repository so that the verification unit can provide an indication whether the design and the at least one condition in a retrieved XML document are syntactically correct.

The apparatus, may in some variations comprise a graphical user interface (e.g., a web browser) to display portions of the retrieved XML document that are not syntactically correct. The apparatus may additionally include or be coupled to a data repository from which the parser, during run-time, retrieves data from the repository to render a report populated with such retrieved data according to an XML document obtained from the XML repository containing a design.

Computer program products, which may be embodied on computer readable-material, are also described. Such computer program products may include executable instructions that cause a computer system to conduct one or more of the method acts described herein.

Similarly, computer systems are also described that may include a processor and a memory coupled to the processor. The memory may encode one or more programs that cause the processor to perform one or more of the method acts described herein.

The subject matter described herein provides many advantages. For example, by providing a grammar for a document containing a design to generate a report and the conditions contained therein, the syntax of the document can be easily verified. With such an arrangement, conditions that are either incorrectly designed or improperly stored in a storage medium can be avoided thereby minimizing errors during rendering of reports which are difficult to debug (especially if the conditions are in a proprietary binary format). In addition, the subject matter described herein obviates the need for specialized software tools which are able to verify a syntax of a design written in a first language and to verify conditions associated with the design written in a second language.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
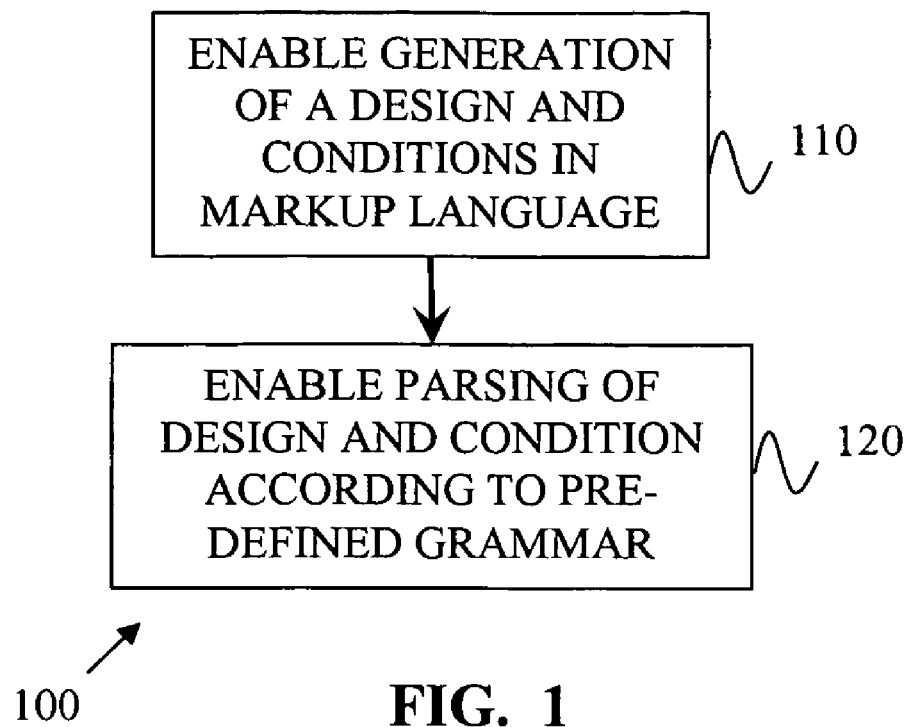
FIG. 1 is a process flow diagram illustrating a method of enabling the generation of a design for a report and for parsing the report.

FIG. 1 is a process flow diagram illustrating a method 100 in which, at 110, the generation of a design in a markup language for rendering a report (based on, for example, business or scientific data). The design specifies at least one section having a visual format and at least one associated condition. The condition is written in the same markup language as the design and additionally defines at least one criterion for rendering the report according to the corresponding visual format. Thereafter, whether during design-time or during run-time, the parsing of the design and the at least one condition according to a pre-defined grammar is enabled, at 120, to determine whether the design and the at least one condition are syntactically correct.

Figure 2:
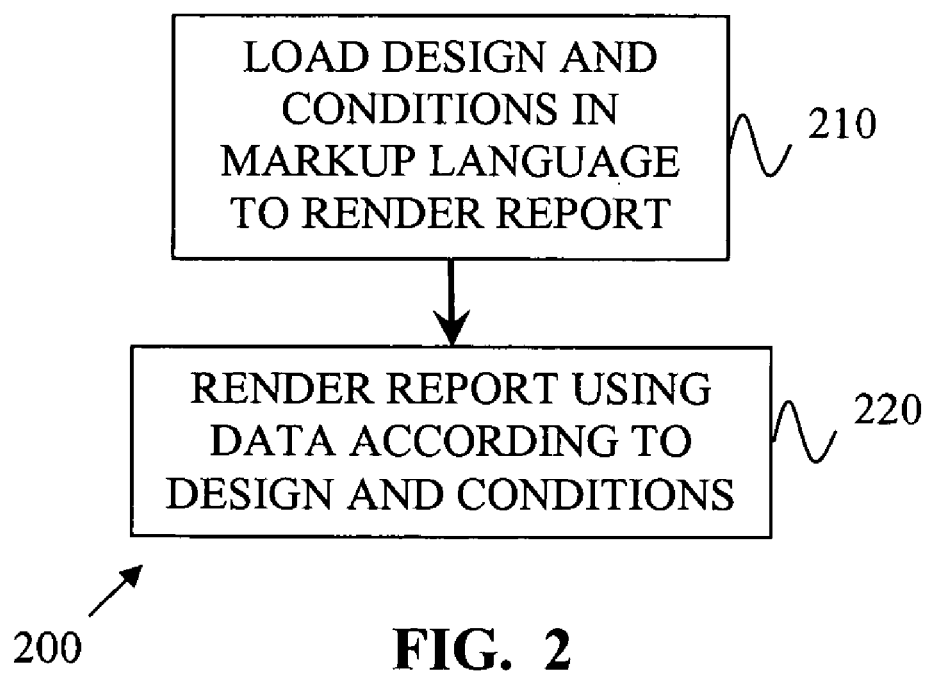
FIG. 2 is a process flow diagram illustrating a method of retrieving a design and for rendering a report according to the retrieved design.

FIG. 2 is a process flow diagram illustrating a computer-implemented method 200, in which, at 210, a design in a markup language is loaded. The design may be used to render a report and specifies at least one section having a visual format and at least one associated condition. The at least one condition is written in the markup language and defines criteria for rendering the report according to the corresponding visual format. Thereafter, the report is rendered (in, for example, a web browser by a rendering component), according to the design and the at least one condition using data (for example, business or scientific data).

Figures 3, 4:
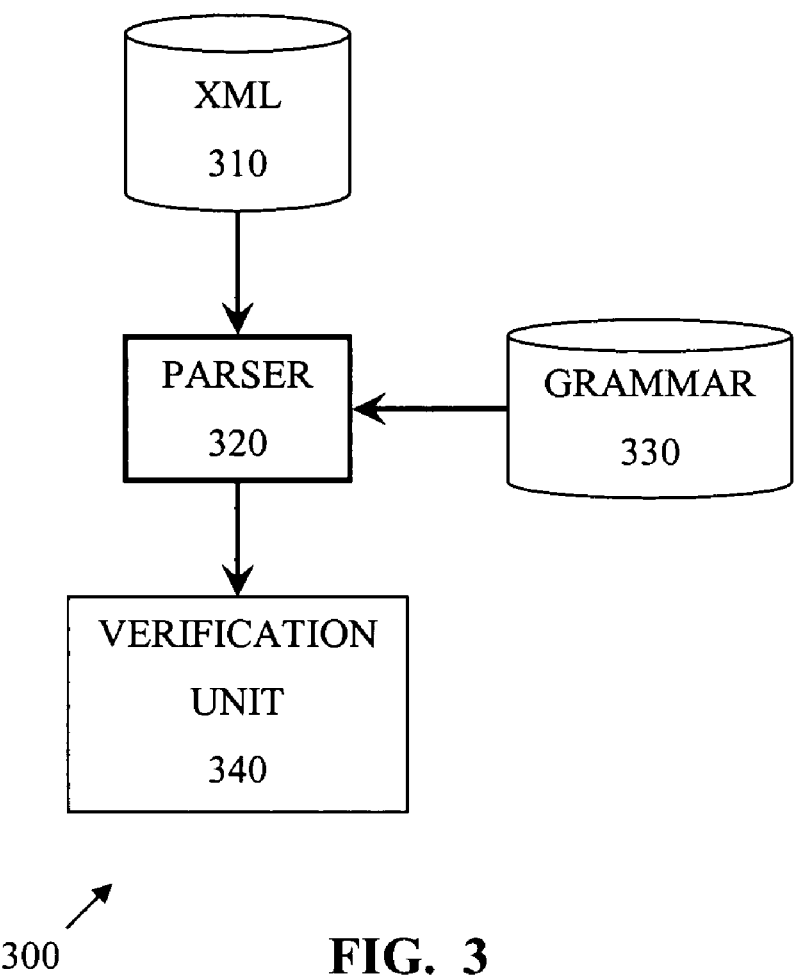
FIG. 3 is a schematic diagram of an apparatus to determine whether a retrieved XML document is syntactically correct.
FIG. 4 illustrates a sample formatted report.

FIG. 3 is a schematic diagram of an apparatus 300 comprising an XML repository 310, a grammar repository 320, a parser 330, and a verification unit 340. The XML repository is operable to store XML documents containing a design for rendering a report, the design specifying at least one section having a visual format and at least one associated condition, the at least one condition being written in XML and defining at least one criterion for rendering the report according to the corresponding visual format. The grammar repository 320 is operable to store XML Schema definitions for the XML documents. The parser is operable to retrieve an XML document from the XML repository and a corresponding XML Schema definition for the grammar repository. The verification unit 330 is coupled to the parser and is operable to provide an indication whether the design and the at least one condition in a retrieved XML document are syntactically correct. Optionally, the parser may also be coupled to a data repository which houses the data used to generate the report.

A design may consist of one or more parts called sections (<section/>tags). While the illustration of a design in a markup language below contains only one section, it will be appreciated that a plurality of sections may be incorporated into a design. Every section may have a list of one or more conditions (within the <conditions/>tag). Every condition (<condition/>tag) may have an expression (<expression/>tag) and may optionally include a description of the visual representation of this portion of the report (<sectionlayout/>tag). During rendering the report, at runtime, the expression is evaluated by the report renderer (i.e., software that produces a final report, for example a report in HTML or PDF format). If the expression is true then the visual representation of the associated condition is used for rendering this part of the report. The expressions in the illustration below are used to evaluate even-or-oddness of the current row number during rendering of report rows. These expressions are used to determine whether a row should be rendered with a light or a dark black background color.

A illustrative design snippet for generating a "zebra" style report, such as the report illustrated in FIG. 4, is provided below:

```
<?xml version="1.0" encoding="iso-8859-1"?>
    <section>
        <conditions>
            <condition>
                <expression>
                    <iseven>
                        <rowcounter/>
                    </iseven>
                    <equal/>
                    <true/>
                </expression>
                <sectionlayout>
                    <!-- Information describing the design of a row
                    with dark blue background here. Omitted for brevity. -->
                </sectionlayout >
            </condition>
            <condition>
                <expression>
                    <isodd>
                        <rowcounter/>
                    </isodd>
                    <equal/>
                    <true/>
                </expression>
                < sectionlayout >
                    <!-- Information describing the design of a row
                    with light blue background here. Omitted for brevity. -->
                </sectionlayout >
            </condition>
        </conditions>
    </section>
```

Applying a pre-defined grammar to the design above with a validating parser, such as an XML parser, will reveal whether the design and the conditions are syntactically correct. The validating XML parser will report any deviation from syntactical correctness. Such reporting may comprise, for example, a visual representation (e.g., highlight or other marking) of each deviation from the pre-defined grammar.

An illustrative grammar snippet for use in parsing a design, whether during design-time of the design or during run-time, that may be used to generate a "zebra" style report, such as the report illustrated in FIG. 4, is provided below:

```
<?xml version="1.0" encoding="iso-8859-1"?>
<xsd:schema xmlns:xsd="http://www.w3.org/2001/XMLSchema">
  <xsd:element name="section">
    <xsd:complexType>
      <xsd:sequence>
        <xsd:element name="conditions" type="conditions_type"
            minOccurs="0" maxOccurs="1"/>
      </xsd:sequence>
    </xsd:complexType>
  </xsd:element>
  <xsd:complexType name="conditions_type">
    <xsd:sequence>
      <xsd:element name="condition" type="condition_type"
          minOccurs="0" maxOccurs="unbounded/">
    </xsd:sequence>
  </xsd:complexType>
  <xsd:complexType name="condition_type">
    <xsd:sequence>
      <xsd:element name="expression" type="expression_type"/>
      <xsd:element name="sectionlayout" type="sectionlayout_type"/>
    </xsd:sequence>
  </xsd:complexType>
  <xsd:complexType name="expression_type">
    <xsd:sequence>
      <xsd:group ref="function_type"/>
      <xsd:element name="equal"/>
      <xsd:group ref="boolvalue_type"/>
    </xsd:sequence>
  </xsd:complexType>
  <xsd:group name="function_type">
    <xsd:choice>
      <xsd:element name="iseven" type="iseven_type"/>
      <xsd:element name="isodd" type="isodd_type"/>
    </xsd:choice>
  </xsd:group>
  <xsd:complexType name="iseven_type">
    <xsd:sequence>
      <xsd:element name="rowcounter"/>
    </xsd:sequence>
  </xsd:complexType>
  <xsd:complexType name="isodd_type">
    <xsd:sequence>
      <xsd:element name="rowcounter"/>
    </xsd:sequence>
  </xsd:complexType>
  <xsd:group name="boolvalue_type">
    <xsd:choice>
      <xsd:element name="true"/>
      <xsd:element name="false"/>
    </xsd:choice>
  </xsd:group>
  <xsd:complexType name="sectionlayout_type">
    <xsd:sequence>
      <!-- Omitted for brevity -->
    </xsd:sequence>
  </xsd:complexType>
</xsd:schema>
```

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer program product, tangibly embodied on computer-readable storage media, the computer program product causing being operable to cause a data processing apparatus to:

retrieve a design document from a markup language repository, the design document comprising markup language defining a design for rendering a report to present data from a data repository, the design defining a plurality of sections of the report, each section comprising a list of at least one associated conditions that are also defined in the markup language, each associated condition comprising both a logical expression pertaining to the data to be presented in the section and a description in the markup language of a visual representation to be used in rendering the section to which the associated condition applies;

retrieve a schema definition from a grammar repository, the schema definition corresponding to the design document and comprising a pre-defined grammar that defines a correct markup language syntax for the design and the associated conditions;

render the report, the rendering comprising evaluating in a report renderer each associated condition for each section to determine if the logical expression is true, and, if the logical expression is true, applying the visual representation described by the condition;

apply the predefined grammar to the design and the at least one condition using a validating parser to determine whether the design and the at least one condition are syntactically correct;

report any determined deviation from syntactical correctness of the design and the at least one condition; and render the report according to the design and the at least one condition using the data;

and write a description of a visual representation specified in each section.

2. A computer program product as in claim 1, wherein the computer program product further causes the data processing apparatus to: display portions of the design and the at least one condition that are not syntactically correct and a corresponding written description of the visual representation.

3. A computer program product as in claim 1, wherein the markup language is XML.

4. A computer program product as in claim 1, wherein the parsing occurs during design-time of the design.

5. A computer program product, tangibly embodied on computer-readable storage media, the computer program product causing a data processing apparatus to:

retrieve a design document from a markup language repository, the design document comprising markup language for rendering a report design and specifying at least one visual format and at least one associated condition that is specified by the markup language and that defines one or more criteria for rendering the report design according to the visual format, the criteria comprising both a logical expression pertaining to the data to be presented in the section and a description in the markup language of a visual representation to be used in rendering a report according to the report design if the logical expression is true;

evaluate each logical expression of the criteria, and, if the logical expression is true, apply the visual representation described by the logical expression;

apply a predefined grammar to the report design and the logical expression using a validating parser to determine whether the report design and the logical expression is syntactically correct, the predefined grammar defining a correct markup language syntax for the design and the logical expression;

report any determined deviation from syntactical correctness;

and render the report using data according to the report design and the at least one logical expression;

and write a description of a visual representation specified in each section.

6. A computer program product as in claim 5, wherein the computer program product further causes the data processing apparatus to: retrieve the design document from a data repository via a communications network.

7. A computer program product as in claim 5, wherein the computer program product further causes the data processing apparatus to: retrieve the pre-defined grammar from a data repository via a communications network.

8. A computer program product as in claim 5, wherein the report is rendered in a web browser.

9. A computer program product as in claim 5, wherein the markup language is XML.

10. A computer program product as in claim 5, wherein the report is rendered in HTML or Portable Document Format.

11. A computer processing apparatus comprising a processor and a memory, the memory storing:

an XML repository to store XML documents containing a design document for rendering a report, the design document specifying at least one section having a visual format and at least one associated condition, the at least one condition being written in XML and defining at least one criterion for rendering the report according to the corresponding visual format;

a grammar repository that stores XML Schema definitions for the XML documents, the XML Schema definitions corresponding to the design document and comprising a pre-defined grammar that defines a correct markup language syntax for the design and the associated conditions;

a parser that is implemented by the processor and that retrieves an XML document form the XML repository and a corresponding XML Schema definition from the grammar repository, the parser rendering the report, the rendering comprising evaluating each associated condition for each section to determine if the logical expression is true, and, if the logical expression is true, applying the visual representation described by the condition;

a verification unit coupled to the parser, the verification unit applying the predefined grammar to the design document and to the at least one condition to provide an indication whether the design and the at least one condition in the retrieved XML document are syntactically correct;

and a graphical user interface to display portions of the retrieved XML document that are not syntactically correct.

12. An apparatus as in claim 11, wherein the graphical user interface comprises a web browser.

13. An apparatus as in claim 11, further comprising a data repository coupled to the parser, and wherein the parser, during run-time, retrieves data from the repository and renders a report populated with the retrieved data according to an XML document obtained from the XML repository containing a design.

14. An apparatus as in claim 11, wherein the report is rendered in HTML or Portable Document Format.

15. An apparatus as in claim 11, wherein the XML repository and the grammar repository are coupled to the parser via a communications network.

16. An apparatus as in claim 11, wherein the parser is an XML validating parser.

* * * * *